WELDING SYSTEM
Filed Sept. 17, 1965 2 Sheets-Sheet 1
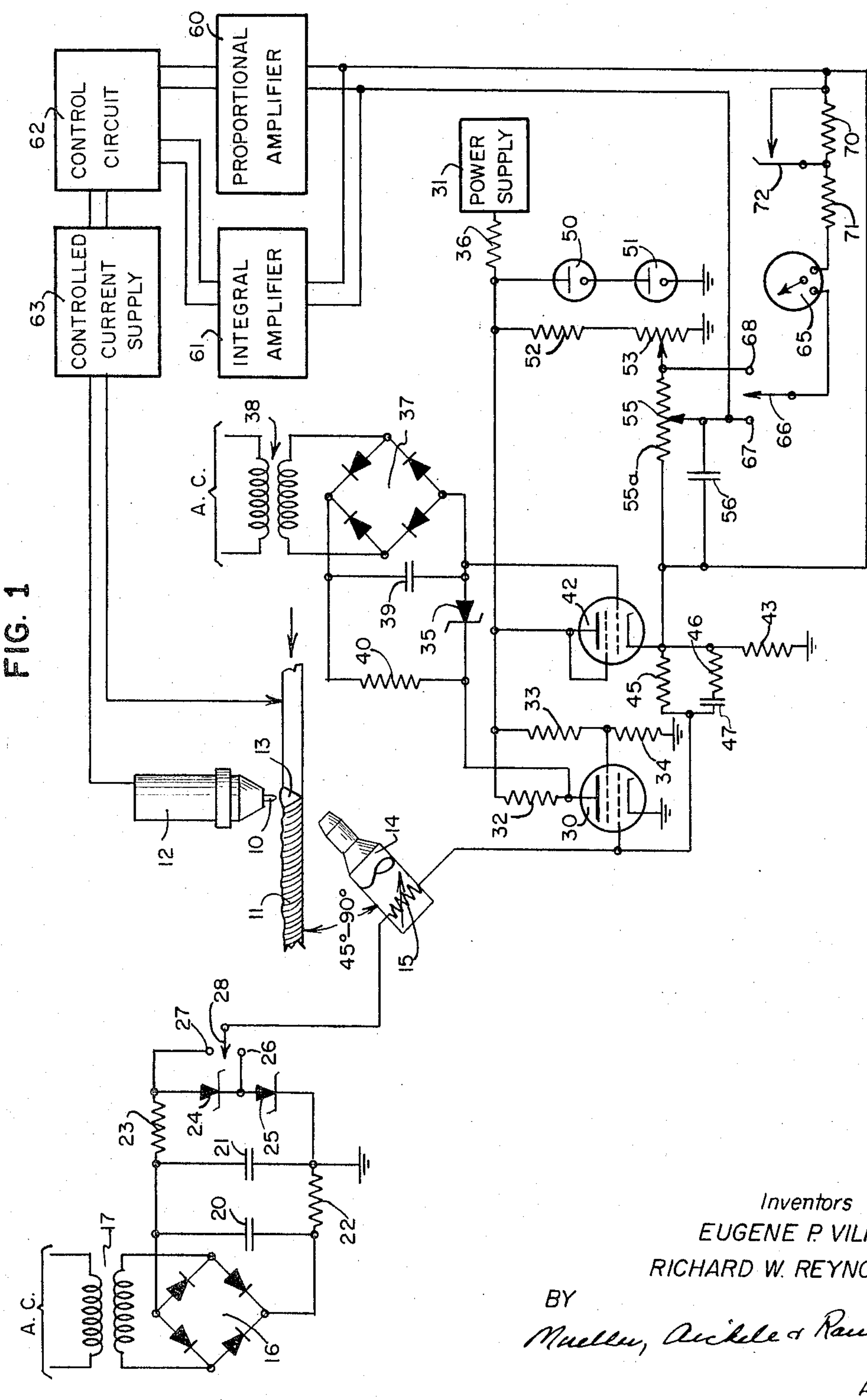
Inventors
EUGENE P. VILKAS
RICHARD W. REYNOLDS.
BY
Mueller, Aichele & Rauner
ATTYS.

WELDING SYSTEM
Filed Sept. 17, 1965 
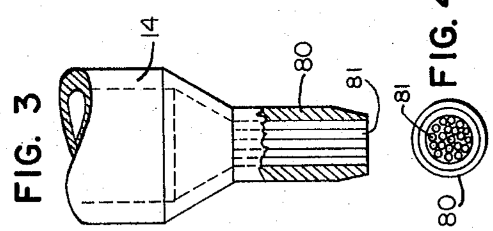
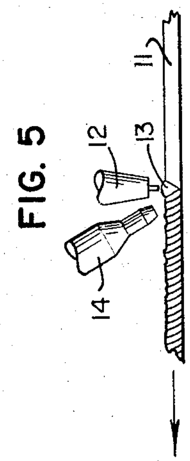
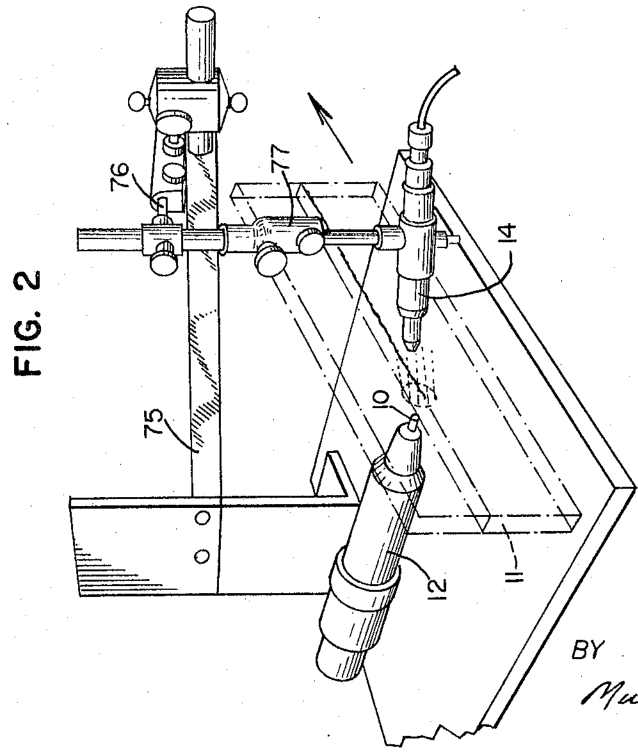
Inventors
EUGENE P. VILKAS
RICHARD W. REYNOLDS.
BY
Mueller, Aichele & Rauner
ATTYS.

United States Patent Office 3,299,250

Patented Jan. 17, 1967

3,299,250
WELDING SYSTEM

Eugene P. Vilkas, Chicago, and Richard W. Reynolds, Hazel Crest, Ill., assignors to Welding Research, Inc., Chicago, Ill., a corporation of Illinois Filed Sept. 17, 1965, Ser. No. 488,193
13 Claims. (Cl. 219—131)

This invention relates to control systems for welding apparatus, and more particularly to a system for controlling weld penetration by sensing the radiation intensity of the molten metal at the weld and controlling the current applied to the welding torch.

In automatic arc welding systems it is desired to control the heat input to the weld so that the desired weld penetration is achieved. In many welding operations, it is desired that constant weld penetration take place over a long welded seam. Systems have been provided which respond to the change in electrode position of an automatic welding head, and change the welding current to thereby control the weld penetration. It is desired, however, to provide a control which responds to the molten metal at the weld itself, to measure the weld penetration and control the welding current to thereby control the weld penetration. Such a welding system should control the weld penetration independently of the condition of the weld joint such as gapping, mismatch, variations in thickness due to tack welds, and variation in the mass adjacent to the welded joint which causes differences in heat dissipation.

It is, therefore, an object of the invention to provide an improved automatic welding system for controlling weld penetration.

Another object of the invention is to provide an automatic welding system wherein the welded work piece is optically sensed to control the heat at the weld and thereby control the weld penetration.

A further object of the invention is to provide a weld penetration controlling system wherein the radiation intensity of the molten metal of the weld is sensed and the welding current is controlled thereby to control the penetration of the weld.

A feature of the invention is the provision of an automatic welding system wherein the position of the welding head is automatically controlled and which includes a device which senses the radiation intensity of the molten metal at the weld to produce a control voltage which is used to control the welding current supplied to the welding electrode.

Another feature of the invention is the provision of an automatic welding system including a sensing device having a photo cell and a collimator for directing the infrared radiation from the weld on the photo cell. The collimator prevents the light of the arc itself from being directed on the photo cell or other sensing device.

Another feature of the invention is the provision of a weld penetration control wherein a photo cell is positioned on the opposite side of the work piece from the welding torch and which senses the radiation intensity of the molten metal. This can operate to control the weld penetration so that the weld completely penetrates the work piece or extends only a portion of the thickness, as may be desired when a weld is made from each side of a work piece.

Another feature of the invention is the provision of a weld penetration control wherein a photo cell is positioned behind the electrode to sense the metal just heated thereby and to control the welding current in accordance with the radiation intensity as measured by the photo cell.

The invention is illustrated in the drawings wherein:

FIG. 1 is a schematic diagram of the welding control system of the invention;

FIG. 2 illustrates in more detail the arrangement of the welding torch and the optical sensing device;

FIG. 3 is a plan view partly broken away showing the collimator of the sensing device;

FIG. 4 is an end view of the collimator of FIG. 3; and

FIG. 5 illustrates an arrangement wherein the welding arc and the sensing device are on the same side of the work piece.

In practicing the invention, an automatic welding system is provided which may be various known types, such as a tungsten inert gas (TIG) welding system having a non-consumable tungsten electrode or a gas metal arc welding system in which the electrode is consumable. The welding electrode may be provided by an automatic welding head which is automatically positioned with respect to the work piece. A sensing device including a photo cell senses the radiation intensity of the molten metal produced by the weld to thereby measure the weld penetration. The photo cell may be positioned on the opposite side of the work piece from the welding electrode or on the same side as the electrode. The sensing device includes a collimator for applying light to the photo cell only from one defined area. The collimator eliminates reflected and scattered rays and is required in particular when the sensing device is on the same side as the welding electrode to exclude intensity of the arc itself. The voltage from the photo cell circuit is amplified to provide a control voltage which is balanced against a reference voltage which may be preset at any desired level. The resulting control signal is positive or negative going when the radiation level deviates correspondingly from the preset level. This control signal is applied to a proportional amplifier and an integral amplifier which together control the level of current applied to the electrode by the welding current supply. In addition to control of the zero or reference level, the output level of the control signal can be varied to thereby change the degree of control provided.

Referring now to the drawings, in FIG. 1 there is shown a welding electrode 10 for producing an arc with respect to a work piece 11. The electrode 10 may be part of an automatic welding head 12 of known construction which is automatically positioned with respect to the work piece. The arc between the welding electrode and the work piece causes a pool of molten metal 13 to form, which produces infrared radiation.

For sensing the radiation intensity of the molten metal, an optical sensing device 14 is provided including a photo cell 15. The photo cell produces a varying impedance depending upon the intensity of the infrared radiation applied thereto. A direct current potential is applied to the photo cell 15 from a power supply including rectifier bridge 16 energized from an A.C. source through transformer 17. The D.C. output of the rectifier bridge is applied through the filter including capacitors 20 and 21 and resistors 22 and 23 to the zener diodes 24 and 25, so that a fixed voltage is developed across each zener diode. The voltage across zener diode 25 is applied to terminal 26, and the voltage across the two zener diodes 24 and 25 is applied to terminal 27 for high sensitivity operation. A switch 28 selectively connects the photo cell 15 to terminal 26 for low sensitivity operation, and to terminal 27 for high sensitivity operation.

The circuit for the photo cell 15 is completed to ground through resistors 43 and 45. The voltage across these resistors is applied to the control grid of tube 30. Tube 30 has its cathode connected to ground, and its plate connected to power supply 31 through load resistor 32. Resistor 36 and voltage regulator tubes 50 and 51 provide regulated potential to the plate of the tube 30, and to the screen thereof through the voltage divider formed by resistors 33 and 34. The output voltage at the plate of tube 30 is combined with a reference voltage developed across zener diode 35 and applied to the grid of tube 42. Rectifier bridge 37 connected to an alternating current supply through transformer 38 supplies a direct current output which is filtered by capacitor 39 and resistor 40 to provide a fixed reference voltage across the zener diode 35. The voltage across the zener diode 35 drops the voltage applied to the grid of tube 42 by a fixed amount to provide a compatible range for the input to the tube 42.

Tube 42 has its cathode connected to resistor 43, and its plate and screen grid connected directly to the regulated power supply 31. Tube 42 is operated as a cathode follower and the output is derived across the cathode load resistor 43. Negative feedback is applied from the cathode of tube 42 to the grid of tube 30 through resistor 45 to stabilize and linearize the gain of the amplifier. The second feedback path including resistor 46 and capacitor 47 causes lower amplification for rapidly changing signals and smooths the control signal applied to the current supply.

The zero or reference voltage for the system is derived from voltage regulators 50 and 51 connected in series across the output of power supply 31. This provides a regulated voltage across resistor 52 and potentiometer 53. A portion of the voltage across potentiometer 53 is derived by the movable tap thereon and constitutes the zero balance voltage of the system. Potentiometer 55 is connected from the tap of potentiometer 53 to the cathode of tube 42 so that a voltage is developed thereacross when the control voltage across resistor 43 differs from the reference voltage derived at the tap of potentiometer 53. The voltage across the portion **55*a* of potentiometer 55 is derived by a movable tap thereon and appears across capacitor 56 as the control signal for the system. This signal is applied to proportional amplifier 60 and integral amplifier 61, which may be constructed as described in copending patent application of Marcel R. Sommeria, now Patent No. 3,237,075. The integral amplifier responds to slow changes in the control signal developed across portion 55*a*, and the proportional amplifier responds to rapid changes in the signal. The outputs of the two amplifiers are applied to the control circuit 62 which in turn controls the welding current supply 63. The welding current supply is connected between the welding electrode 10 and the work piece 11**.

In order to provide a visual indication of the control signal, a meter 65 is provided. The meter has one terminal connected to switch 66, which is selectively connected to terminals 67 and 68. The other terminal of the meter is connected through resistors 70 and 71 to the lower terminal of potentiometer 55. When the switch 66 is connected to terminal 67, the voltage across portion **55*a* is applied to the meter, so that the meter indicates the control signal. When switch 66 is connected to terminal 68, the meter 65** reads the unattenuated output of the amplifier. This develops a more responsive meter swing and also a standard output level. This standard level is useful for checking and setting the degree of photo cell illumination necessary to drive the amplifier output to zero. This setting is the one which controls the degree of penetration.

Switch 72 is bridged across resistor 70 to short out this resistor for readings in a lower range. For readings in a higher range, the two resistors 70 and 71 are provided in series so that the current through the meter is only one-half that in the lower range. This position is used for checking sensitivity. The meter has a zero center setting and indicates the polarity and value of potentials across potentiometer 55 and the portion **55*a*** thereof.

Considering now the operation of the system, when the arc is produced at the welding head 10, the photo cell 15 will sense the intensity of the infrared radiated by the puddle of molten metal in the work piece produced by the heat of the arc. The system can be started in any known way, and the control system of the invention will take over after the arc is started. Switch contact 28 is operated to select the sensitivity of the system. In the event that the sensitivity as indicated by the meter 65 is too great, even when the switch is connected to point 26 for low sensitivity, the sensing device must be moved farther from the work piece to reduce the radiation pickup. The low sensitivity setting is commonly used when penetration all the way through the work piece is desired and the radiation intensity is high. In the event that penetration only part way through the work piece is desired, as when welding on each side of a work piece, the radiation intensity when welding the first side will be much less and it may be desired to set the sensitivity control so that switch 28 engages contact 27 to provide the high sensitivity.

The potentiometer 53 is set to produce a reference voltage corresponding to the desired weld penetration. The system will then produce a control signal when the current through tube 42 produces an output voltage across cathode resistor 43 which differs from the reference voltage. The setting of the tap of potentiometer 55 controls the welding current change rate resulting from the difference of the control voltage from the reference voltage. It will be apparent that when the tap is connected near the lower end of the potentiometer 55, a minimum signal will be derived therefrom to cause a minimum change rate in the welding current. When the tap is set near the top of the potentiometer 55, a large control signal will be applied so that a greater rate of change will be produced by the welding current supply.

As the control signal is zero when the penetration is at the desired level, the setting of potentiometer 55 does not control the level of penetration but controls only the degree of the response of the system to a change in weld penetration. The degree of response desired will depend upon the particular welding operation being performed. When a very fast response is produced, there may be a tendency in the system to oscillate about the center point which may be objectionable. The meter 65 when connected through switch 66 to contact 67 indicates the magnitude of the control signal which is applied to the welding current supply. This indicates changes in weld penetration and the requirement for changes in current supplied to produce the desired weld penetration. The meter is normally connected to terminal 68 with a momentary contact spring return contact to terminal 67.

FIG. 2 illustrates in greater detail the construction of the optical sensing system of the invention. As previously stated, the welding electrode 10 may be provided by a standard automatic welding head 12 which is automatically positioned with respect to the work piece 11. The sensor 14 is mounted on a support 75 connected to the welding machine, through adjustable arms 76 and 77. As will be apparent the arms can be adjusted to provide vertical, horizontal and angular position adjustments so that the sensing device 14 can be positioned as desired. It has been found that the sensing device 14 should be at an angle of from 45 to 90 degrees trailing with respect to the weld, as shown in FIG. 1. The welding head 12 and sensor 14 are mechanically connected so that they maintain the same positional relationship.

In order that the radiation applied to the photo cell or other optical sensing device is from a defined area of the work piece, a collimator structure is positioned at the radiation input to the sensing device. This is shown in FIG. 3 wherein the input tube 80 through which radiation is applied to the photo cell includes a number of small tubes 81. The small thin wall (0.005″) tubes may be made of stainless steel having an inside diameter of about 0.050 inch and may be about one inch long. In such case, twenty or more tubes can be provided in the inlet to the photo cell. This collimator structure is blackened to reduce reflections. These tubes will permit only direct rays to pass to the photo cell and will eliminate reflective and scattered rays. FIG. 4 is an end view showing the plurality of tubes at the light inlet to the sensing device.

FIG. 5 shows a second embodiment of the invention wherein the photo cell is positioned to sense the radiation of an area of the work piece immediately behind the arc. The work piece 11 is moving in the direction of the arrow so that the area to the left of the torch 10 has been welded. The photo sensing device 14 senses the infrared radiation of the molten metal which has just been heated by the arc, and the collimator prevents the light from the arc itself from being directed on the photo cell. The system of FIG. 5 may be preferable in certain instances wherein only one side of the work piece is accessible and the sensing must be from the side on which the arc is produced.

The system of the invention has been found to be very effective in controlling weld penetration. The system in effect is a closed loop feedback system which is closed through the sensing of the radiation. The system tends to hold the penetration at a fixed level so that the radiation is constant. When the penetration and radiation vary, the system controls the welding current to change the penetration level to bring it back to the fixed level. The sensitivity of the control becomes the stiffness of the closed loop system.

A system which senses from the opposite side from the electrode can accurately control the penetration to any depth. In some cases the weld is controlled ½ to ⅔ the way through the work piece from each side, and the resulting weld has the desired complete tie in of the passes from the two sides. The intensity of the radiation can also be sensed from the same side as the electrode. The sensitivity of the system, the level of penetration and the degree of control can each be easily and effectively adjusted to provide the desired welding control.

What is claimed is:

1. In welding apparatus of the type in which a welding electrode is positioned to strike an arc with a work piece to heat the same to produce a weld, a system for controlling the penetration of the weld including in combination, welding current supply means connected to the welding electrode and the work piece for providing controlled current through the welding arc, radiation sensitive means responsive to the radiation emitted by the heated material of the work piece, said radiation sensitive means including a radiation sensitive device positioned to receive radiation from the heated material and provide an indication thereof, circuit means coupled to said radiation sensitive device for producing a control voltage which varies with said radiation indication, said circuit means including a circuit portion responsive to rapid changes in the control voltage to reduce the effect thereof in the output signal of said circuit means, and control means connected to said circuit means and to said welding current supply means and responsive to said output signal for controlling the current supplied to the arc by the welding current supply means.

2. In welding apparatus of the type in which a welding electrode is positioned to strike an arc with a work piece to heat the same, and which includes a welding current supply for providing controlled current through the welding arc, a system for controlling the welding operation including in combination, radiation sensitive means responsive to infrared radiation of the heated material of the welded work piece, said radiation sensitive means including electronic sensing means and collimator means for directing radiation from the work piece on said sensing means, circuit means coupled to said sensing means for producing a control voltage and for producing a reference voltage representing the desired radiation, said circuit means including a circuit portion responsive to rapid changes in the signal from said electronic sensing means to reduce the effect thereof in said control voltage, said circuit means operating in response to said control voltage and said reference voltage to produce a control signal, and control means connected to the welding current supply and responsive to said control signal for controlling the current supplied to the arc by the welding current supply.

3. In welding apparatus of the type in which a welding electrode is positioned to strike an arc with a work piece to heat the same, and which includes a welding current supply for providing controlled current through the welding arc, a system for controlling the welding operation including in combination, radiation sensitive means responsive to the radiation from the heated material of the work piece, said radiation sensitive means producing a voltage which varies with the intensity of said radiation, circuit means coupled to said radiation sensitive means for amplifying the voltage therefrom to produce a control voltage, reference voltage means connected to said circuit means for producing a reference voltage defining a desired radiation intensity, said circuit means including adjustable means responsive to said control voltage and said reference voltage to produce a control signal, with the amplitude of said control signal depending on the relation of said control voltage to said reference voltage and the setting of said adjustable means, and control means connected to the welding current supply and responsive to said control signal for controlling the current supplied to the arc by the welding current supply, said control means including an integral amplifier portion responsive to relatively slow changes in said control signal and a proportional amplifier portion responsive to relatively fast changes in said control signal.

4. In welding apparatus of the type in which a welding electrode is positioned on one side of a relatively moving work piece to strike an arc therewith to heat the same, and which includes a welding current supply for providing controlled current through the welding arc, a system for controlling the weld penetration including in combination, radiation sensitive means on the side of said work piece opposite to the electrode and responsive to the radiation from the heated material of the work piece, said radiation sensitive means supplying a continuous voltage which varies with the intensity of said radiation, circuit means coupled to said radiation sensitive means for amplifying the voltage therefrom to produce a continuous control voltage, said circuit means including a circuit portion responsive to rapid changes in the voltage from said radiation sensitive means to reduce the effect thereof in said continuous control voltage, reference voltage means connected to said circuit means for producing a reference voltage defining a desired radiation intensity, said circuit means including adjustable means responsive to said control voltage and said reference voltage to produce a continuous control signal, and control means connected to the welding current supply and responsive to said control signal for controlling the current supplied to the arc by the welding current supply.

5. In welding apparatus of the type in which a welding electrode is positioned on one side of a relatively moving work piece to strike an arc therewith to heat the same, and which includes a welding current supply for providing controlled current through the welding arc, a system for controlling the weld penetration including in combination, radiation sensitive means on the side of said work piece opposite to the electrode and responsive to the radiation from the heated material of the work piece, said radiation sensitive means including a photo cell which produces a voltage which varies with the intensity of said radiation and collimator means for passing radiation to said photo cell, said collimator means being directed to accept radiation at an angle in the range from 45 to 90 degrees with respect to the work piece, circuit means coupled to said photo cell for amplifying the voltage therefrom to produce a control voltage, said circuit means including a control portion responsive to rapid changes in the voltage from said photo cell to reduce the effect thereof in said control voltage, reference voltage means connected to said circuit means for producing a reference voltage defining a desired radiation intensity, said circuit means including adjustable means responsive to said control voltage and said reference voltage to produce a control signal, and control means connected to the welding current supply and responsive to said control signal for controlling the current supplied to the arc by the welding current supply.

6. In welding apparatus of the type in which a welding electrode is positioned on one side of a relatively moving work piece to strike an arc therewith to heat the same, and which includes a welding current supply for providing controlled current through the welding arc, a system for controlling the weld penetration including in combination, infrared radiation sensitive means on the same side of said work piece as the electrode and responsive to the radiation from the heated material of the work piece, said radiation sensitive means including electronic means producing a voltage which varies with the intensity of said radiation and collimator means for passing radiation to said electronic means, said collimator means being directed to the portion of the work piece which has just been heated by the arc and excluding radiation directly from the arc, circuit means coupled to said electronic means for amplifying the voltage therefrom to produce a control voltage, said circuit means including a circuit portion responsive to rapid changes in the voltage from said electronic means to reduce the effect thereof in said control voltage, reference voltage means connected to said circuit means for producing a reference voltage defining a desired radiation intensity, said circuit means including adjustable means responsive to said control voltage and said reference voltage to produce a control signal, and control means connected to the welding current supply and responsive to said control signal for controlling the current supplied to the arc by the welding current supply.

7. In welding apparatus of the type in which a welding electrode is positioned to strike an arc with a relatively moving work piece to heat the same to produce a weld, and which includes a welding current supply for providing controlled current through the welding arc, a system for controlling the weld penetration including in combination, radiation sensitive means responsive to infrared radiation of the heated material of the welded work piece, said radiation sensitive means including a photo cell and collimator means for directing radiation from the work piece to said photo cell, circuit means coupled to said photo cell for producing a control voltage and for producing a reference voltage representing the desired radiation, said circuit means operating in response to said control voltage and said reference voltage to produce a control signal, said circuit means having a portion responsive to rapid changes in said control voltage to reduce the effect thereof in said control signal, and control means connected to the welding current supply and responsive to said control signal for controlling the current supplied to the arc by the welding current supply, said control means including an integral amplifier portion responsive to relatively slow changes in said control signal and a proportional amplifier portion responsive to relatively fast changes in said control signal.

8. In welding apparatus of the type in which a welding electrode is positioned on one side of a relatively moving work piece to strike an arc therewith to heat the same, and which includes a welding current supply for providing controlled current through the welding arc, a system for controlling the weld penetration including in combination, infrared radiation sensitive means on the same side of said work piece as the electrode and responsive to the radiation from the heated material of the work piece, said radiation sensitive means including a photo cell producing a voltage which varies with the intensity of said radiation and collimator means for passing radiation to said photo cell, said collimator means being directed to the portion of the work piece which has just been heated by the arc and excluding radiation directly from the arc, circuit means coupled to said photo cell for amplifying the voltage therefrom to produce a control voltage, said circuit means including a circuit portion responsive to rapid changes in the voltage from said photo cell for reducing the effect thereof on said control voltage, reference voltage means connected to said circuit means for producing a reference voltage defining a desired radiation intensity, said circuit means including adjustable means responsive to said control voltage and said reference voltage to produce a control signal, and control means connected to the welding current supply and responsive to said control signal for controlling the current supplied to the arc by the welding current supply.

9. In welding apparatus of the type in which a welding electrode is positioned to strike an arc with a work piece to heat the same, and which includes a welding current supply for providing controlled current through the welding arc, a system for controlling the weld penetration including in combination, radiation sensitive means responsive to the radiation from the heated material of the work piece, said radiation sensitive means including a photo cell and potential supply means connected to the same so that the photo cell provides a control voltage which varies with the intensity of the radiation, said potential supply means including adjustable means for controlling the voltage applied thereto to thereby control the sensitivity of said photo cell and the level of said control voltage, circuit means including reference voltage means and potentiometer means coupled to said photo cell and to said reference voltage means for producing a control signal, said reference voltage means being adjustable to provide a reference voltage which represents the weld penetration to be obtained, said potentiometer being adjustable to control the level of said control signal, and control means connected to the welding current supply and responsive to said control signal for controlling the current supplied to the arc by the welding current supply.

10. In welding apparatus of the type in which a welding electrode is positioned to strike an arc with a relatively moving work piece to heat the same, and which includes a welding current supply for providing controlled current through the welding arc, a system for controlling the weld penetration including in combination, radiation sensitive means responsive to infrared radiation of the heated material of the welded work piece, said radiation sensitive means including a photo cell and collimator means for directing radiation from the work piece on said photo cell, circuit means coupled to said photo cell for applying a voltage thereto so that said photo cell produces a control voltage which varies with the intensity of the infrared radiation, said circuit means including means for producing a reference voltage representing the desired weld penetration and potentiometer means connected to said photo cell and to said reference voltage means for producing a control signal which depends upon the variation of said control voltage with respect to said reference voltage, said circuit means including a circuit portion responsive to rapid changes in said control voltage to reduce the effect thereof in said control signal, and control means connected to said potentiometer and to the welding current supply and responsive to said control signal for controlling the current supplied to the arc by the welding current supply, said control means including an integral amplifier portion responsive to relatively slow changes in said control signal and a proportional amplifier portion responsive to relatively fast changes in said control signal.

11. In welding apparatus of the type in which a welding electrode is positioned to strike an arc with a relatively moving work piece to heat the same, and which includes a welding current supply for providing controlled current through the welding arc, a system for controlling the weld penetration including in combination, radiation sensitive means responsive to infrared radiation of the heated material of the welded work piece, said radiation sensitive means including a photo cell and collimator means for directing radiation from the work piece on said photo cell, circuit means coupled to said photo cell for applying a voltage thereto so that said photo cell supplies a control voltage which varies with the intensity of the infrared radiation, said circuit means being adjustable to control the level of the voltage applied to the photo cell to thereby control the sensitivity of said photo cell and the level of said control voltage, said circuit means including means for producing a reference voltage representing the desired weld penetration and potentiometer means connected to said photo cell and to said reference voltage means for producing a control signal which depends upon the variation of said control voltage with respect to said reference voltage, and control means connected to said potentiometer and to the welding current supply and responsive to said control signal for controlling the current supplied to the arc by the welding current supply, said reference voltage means being adjustable to preset the weld penetration and said potentiometer being adjustable to control the level of the control signal applied to said control means, said control means including an integral amplifier portion responsive to relatively slow changes in said control signal and a proportional amplifier portion responsive to relatively fast changes in said control signal.

12. In welding apparatus having controls for determining penetration of a weld, and wherein radiation from the weld provides an indication of the weld penetration, apparatus for actuating the controls to provide a predetermined weld penetration including in combination, radiation sensing means in radiation receiving relation to the weld and supplying an electrical signal indicating received radiation, circuit means operatively connected to said sensing means and responsive to said electrical signal for supplying a control voltage, said circuit means having a circuit portion responsive to rapid changes in said electrical signal to smooth out the effect thereof in said control voltage, dual action amplifier means connected to the circuit means and amplifying said control voltage to provide two output signals, one corresponding to relatively slow changes in said control voltage and another corresponding to relatively fast changes in said control voltage, and control circuit means connected to said amplifier means and to the welding controls for controlling the weld penetration in accordance with said two output signals.

13. In welding apparatus having controls for determining penetration of a weld, and wherein radiation from the weld area provides an indication of weld penetration, a control loop for actuating the controls to provide a predetermined weld penetration including in combination, radiation sensing means in radiation receiving relation to the weld and supplying an electrical signal indicative of received radiation, reference means providing a reference voltage indicative of desired weld penetration, circuit loop means connected to said sensing means and to said reference means and coupled to the welding controls for continuously supplying control signals thereto in response to variations of said electrical signal with respect to said reference voltage, said circuit loop means including a circuit portion responsive to rapid changes in said electrical signal to reduce the responsiveness of said loop means to such changes and a variable portion for adjusting the magnitude of the supplied control signals to thereby adjust the rate of control, and including integral and proportional signal amplifier portions respectively altering said supplied control signals in response to relatively slow and relatively fast changes in said electrical signal.

References Cited by the Examiner

UNITED STATES PATENTS 2,031,288 2/1936 Tripp ---------- 219—135
2,089,014 8/1937 Buchnam et al. ---- 219—135 X
3,209,121 9/1965 Manz ---------- 219—130
3,240,913 3/1966 Schubert ---------- 219—60

FOREIGN PATENTS 865,222 4/1961 Great Britain.

References Cited by the Applicant

UNITED STATES PATENTS 2,223,177 11/1940 Jones.
2,662,991 12/1953 Gretener.

FOREIGN PATENTS 767,690 2/1957 Great Britain.

RICHARD M. WOOD, *Primary Examiner.*